United States Patent
Fioritto et al.

(10) Patent No.: US 6,247,271 B1
(45) Date of Patent: *Jun. 19, 2001

(54) AUTOMOTIVE DOOR SEAL FOR ACCOMMODATING WELD FLANGES HAVING DIFFERENT THICKNESSES

(75) Inventors: Brian J. Fioritto, Plymouth; David A. Okragly, Wixom, both of MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/937,078

(22) Filed: Sep. 24, 1997

(51) Int. Cl.⁷ ........................................................ E06B 7/16
(52) U.S. Cl. ........................ 49/490.1; 49/484.1; 49/495.1
(58) Field of Search ................................ 49/498.1, 475.1, 49/490.1, 484.1, 495.1

(56) References Cited

U.S. PATENT DOCUMENTS

| | | |
|---|---|---|
| 2,899,721 | 8/1959 | Herman . |
| 4,695,499 * | 9/1987 | Whitener ............................ 428/122 |
| 4,702,039 | 10/1987 | Bocchinfuso . |
| 4,744,570 | 5/1988 | Kranz . |
| 4,787,668 | 11/1988 | Kawase et al. . |
| 4,813,184 | 3/1989 | Weimar . |
| 4,819,382 | 4/1989 | Suzuki et al. . |
| 4,843,759 | 7/1989 | Kusanuki et al. . |
| 4,869,945 * | 9/1989 | Harney ................................ 428/122 |
| 5,014,464 * | 5/1991 | Dupuy et al. .......................... 49/440 |
| 5,072,546 | 12/1991 | Ogawa ................................ 49/490.1 |
| 5,226,258 * | 7/1993 | Mesnel et al. ...................... 49/490.1 |
| 5,437,124 * | 8/1995 | Ahlfeld et al. ...................... 49/479.1 |
| 5,469,667 * | 11/1995 | Le Marrec .......................... 49/477.1 |
| 5,545,448 * | 8/1996 | Ford et al. .............................. 428/31 |
| 5,618,608 | 4/1997 | Teishi . |
| 5,622,008 | 4/1997 | King .................................... 49/498.1 |
| 5,628,150 * | 5/1997 | Mesnel .................................. 49/440 |
| 5,686,165 * | 11/1997 | Cook .................................... 428/122 |

FOREIGN PATENT DOCUMENTS

| | | |
|---|---|---|
| 1 102 086 | 3/1966 | (GB) . |
| 2 172 640 | 3/1985 | (GB) . |
| 2239282 | 12/1989 | (GB) . |
| 2279985 | 7/1994 | (GB) . |

* cited by examiner

Primary Examiner—Gregory J. Strimbu
(74) Attorney, Agent, or Firm—Gigette M. Bejin; David B. Kelley

(57) ABSTRACT

A door seal for an automotive vehicle that requires low insertion effort and high extraction effort, that makes correct insertion onto a weld flange easier, and that provides a complete seal even in tight corners without adversely affecting door closing effort. The seal attaches to a weld flange located around the perimeter of a side door opening of the automotive vehicle and has such features as a channel with hinged gripping fingers and digits, an anti-rotation member, a bulb shaped hollow sealing member, interior trim gap hiding lip and weld hiding member.

8 Claims, 3 Drawing Sheets

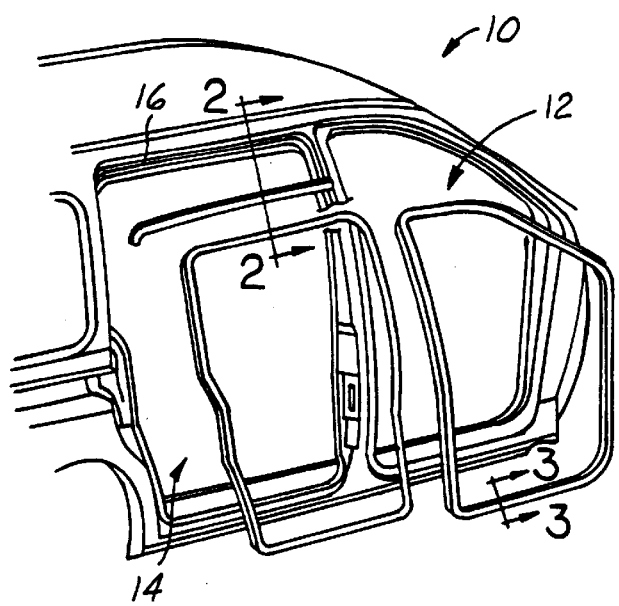
FIG.1
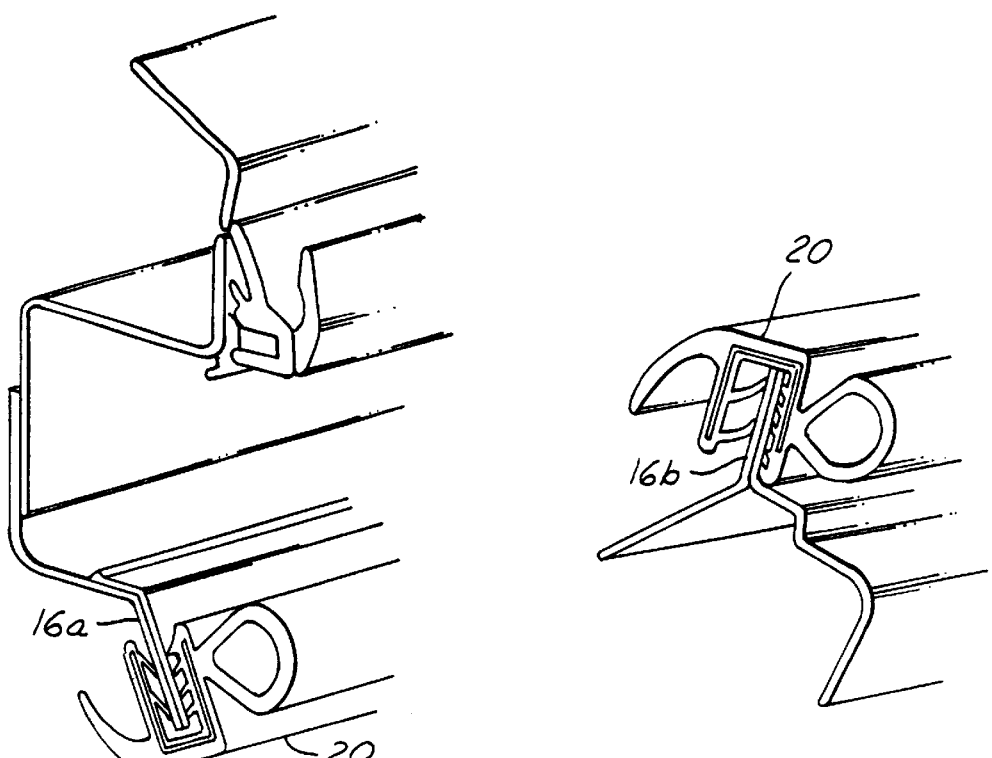
FIG.2
FIG.3

AUTOMOTIVE DOOR SEAL FOR ACCOMMODATING WELD FLANGES HAVING DIFFERENT THICKNESSES

FIELD OF THE INVENTION

The present invention relates to door seals in general, and more specifically to a door seal for use on a body side door opening of an automotive vehicle.

BACKGROUND OF THE INVENTION

Door seals, and in particular door seals for attaching around a body door opening in an automotive vehicle, must perform many functions. Primarily this includes prevention of moisture, such as rain, sleet, ice, snow, and wash water, from leaking into the passenger compartment. The seal must also prevent noise such as road, engine, and wind noise from penetrating into the passenger compartment. Additionally, the seal determines the quality of the fit between a vehicle door and the vehicle body. A good fit affects door closing effort and seal appearance, important elements in customer perception of vehicle quality.

To accomplish these functions effectively, a seal must not only be designed to properly interact with the weld flange to which it is typically attached, and the adjacent door and body surfaces, but must also must be easily attached to the weld flange while being more difficult to remove. Low seal attachment effort is necessary to expedite vehicle assembly, while seal extraction effort must be higher to provide seal retention and to prevent seal disengagement during door usage.

In addition to meeting insertion and extraction effort requirements, a door opening seal must also be capable of fitting on the vehicle weld flange. Variable thickness weld flanges around a door opening may cause a seal to fit improperly, thus decreasing its moisture and noise deterrent functions. Additionally, some body side openings have very tight corners to which the seal must be attached, making it difficult to achieve a tight fit. An improper fit due to either of these conditions adversely affects insertion and extraction efforts, and seal quality. Previous weather strip seal designs had to trade off high insertion efforts, including effort to maintain accurate alignment, on thick weld flanges in order to have acceptable extraction efforts on thinner flanges, and required costly molded details to go around tight body side assembly corners in order to avoid puckering of the seal.

SUMMARY OF THE INVENTION

The present invention overcomes the disadvantages of the related art by providing a door seal that requires low insertion effort and high extraction effort, an anti-rotation member that makes accurate insertion easier, and a hollow bulb sealing member shaped so that a complete seal is maintained in tight corners, without adversely affecting door closing effort.

The door seal is comprised of a channel for receiving a weld flange defined by two opposed sides and a connecting side. Three digits extend from the inner face of one channel side at a predetermined angle $\theta_1$. Two frustoconically shaped fingers with rounded tips extend from the inner face of the opposed side at a predetermined angle $\theta_2$. In a preferred embodiment, angles $\theta_1$ and $\theta_2$ are between 55° and 80°. The choice of angle, combined with the other features described below, allows mating to be accomplished with the desired insertion and extraction effort.

The finger proximate to the channel opening is made to extend further into the channel than the finger proximate to the connecting side, and both fingers extend more that halfway across the width of the channel, reducing the effort needed to insert the flange, while increasing the effort needed to extract the flange by providing a larger area over which the fingers grip the flange. The fingers have a radiused indentation hinge point at their base, facing the connecting wall, to facilitate bending of the fingers on insertion of the weld flange. The finger proximate to the channel opening also has a beveled section tip hinge point that faces the connecting wall, to facilitate increased bending of the finger on insertion of a thick weld flange.

The combination of these elements, the digits, the fingers with base hinge points and one with a tip hinge point, and the extension of the fingers a set distance into the channel, is such that the required insertion force is reduced while the required extraction force is increased, for a variety of weld flange thicknesses, which typically can range from 2.0 mm to 6.0 mm. The members were specifically designed so that they would allow easy entry of the weld flange into the channel, while preventing its extraction by providing fingers that grab when a reverse motion is attempted. The tip hinge point specifically, on insertion provides more bending to allow even thick flanges to enter, but conversely, applies more mating surface area to the flange making extraction more difficult. These elements uniquely combine to achieve this result.

The addition of a triangular anti-rotation member extending from the inner face of the side wall with the digit members, located proximate to the opening of the channel, assures that a good fit is obtained on insertion of the weld flange into the channel. This anti-rotation member is unique in that it assures a straight fit into the channel by preventing rotation that tends to misalign the flange, causing a poor fit.

A weld hiding member extends from the top of the channel wall then curves inward towards the channel, enhancing the appearance of the vehicle by hiding the weld from the customer view. Additionally, a wire carrier, as opposed to a lance carrier, is inserted in the channel walls to provide sufficient stiffness while allowing the seal to flexibly fit in tight corners.

A hollow bulb sealing member, meant to provide a sealing surface between the body and the door, is attached to the outer surface of the digit side of the channel, and is generally shaped as a cone, having two straight edges that mate at a prescribed angle and attach to the channel wall, and a generally arcuate section joining the straight edges. The edges are of disparate length, the shorter edge being located proximate to the connecting side of the channel. This is a special design feature to insure that the best possible fit is maintained between the door and the seal under a variety of straight or arced sections of the door perimeter.

When the seal is in a straight section of the door perimeter, the design of the bulb is such that the bulb surface presented to the mating door surface is generally slanted inward, such that the outer edge of the seal mates with the outer edge of the door. Since a function of the seal is to keep water and noise from entering into the passenger compartment, it is important to have a complete seal on the outer edge of adjacent mating surfaces. However, when the door seal is attached to a weld flange around a tight corner, having a small radius of curvature, a bulb member typically tends to rotate upwards and separate from adjacent surfaces. To remedy this problem the inner arm of the seal of the present invention is shorter and the upper arm is longer, so that the bulb surface presented to the mating door surface is generally parallel to the door surface, such that the entire face of the seal mates with the outer edge of the door. The design of the bulb in the present seal is such that a complete seal can be maintained around corners. Moreover, the design is such that puckering of the bulb surface in tight corners is eliminated for high curvature radii, as well as eliminating the need for the use of molded details around the corner to enhance the appearance and improve the fit.

An advantage of the present invention is a door seal which can be used on vehicles with a weld flange having a variable thickness while meeting insertion and extraction effort requirements.

Another advantage of the present invention is a door opening seal with a bulb member that improves the quality of fit and decreases puckering around tight corners, while not adversely affecting door closing effort.

Another advantage is a door opening seal having an anti-rotation finger to prevent skewing of the seal upon insertion onto the weld flange, which improves the quality and fit of the seal.

Yet another advantage is a door opening seal which improves vehicle noise, vibration and harshness (NVH) performance.

Yet still another advantage of the present invention is a seal which eliminates the need for molded details, thus eliminating joint lines and parting lines.

Another advantage of the present invention is a door opening seal which improves seal durability.

A feature of the present invention is a door opening seal which is a continuous extruded section, including a constant bulb cross-section, over the entire seal without molded details, particularly at the corners.

Still another feature of the present invention is door opening seal which has a set of fingers within a channel which cooperate to provide acceptable insertion and extraction efforts.

BRIEF DESCRIPTION OF THE DRAWINGS

These and other objects, advantages, and features of the present invention will be apparent to those skilled in the art upon reading the following description with reference to the accompanying drawings, in which:

FIG. 1 is a partial perspective view of a vehicle with door openings having a seal according to the present invention shown in exploded view;

FIG. 2 is a sectional perspective view taken along line 2—2 of FIG. 1;

FIG. 3 is a sectional perspective view taken along line 3—3 of FIG. 1;

DETAILED DESCRIPTION OF THE PREFERRED EMBODIMENT

Figure 4:
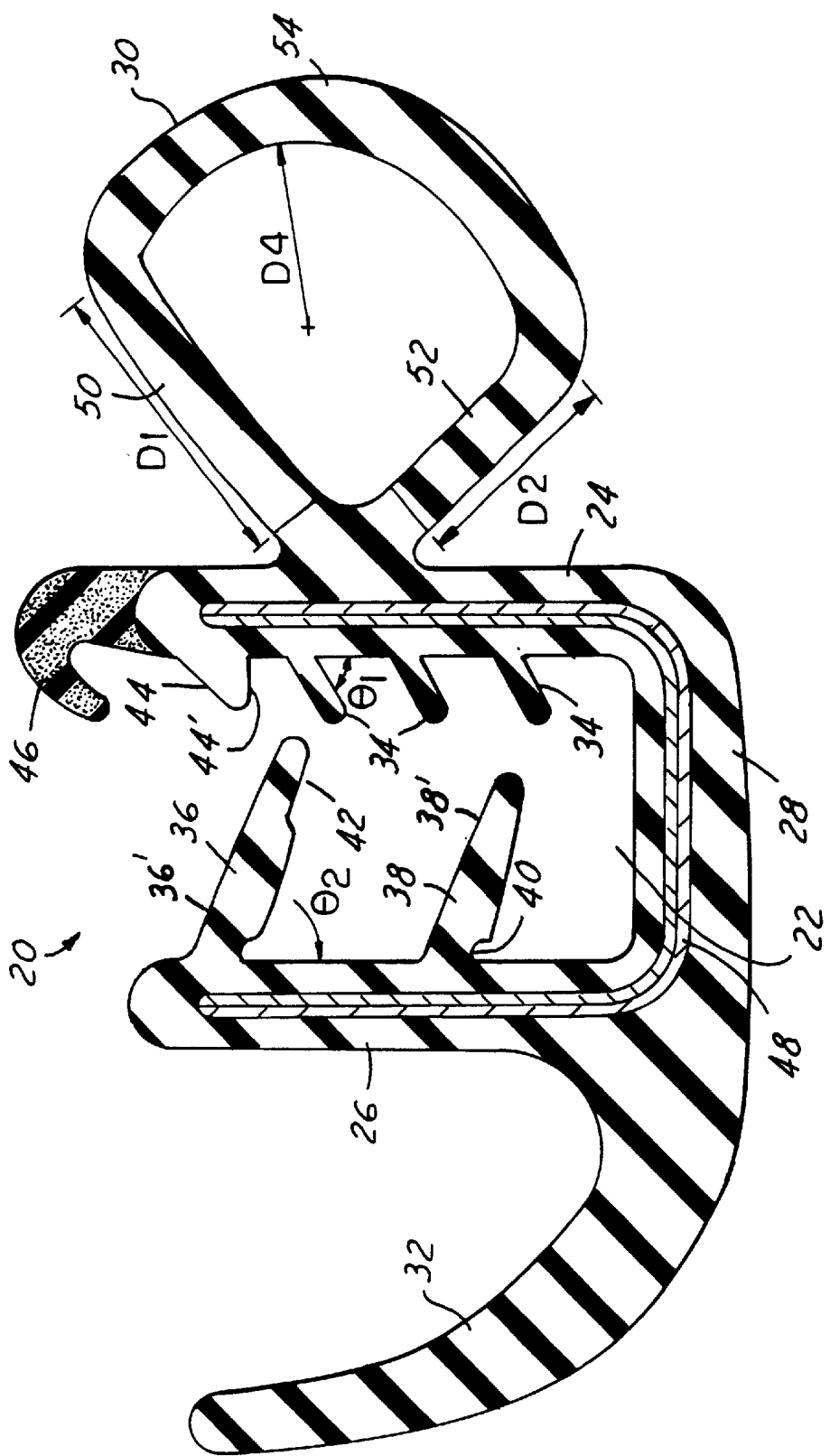
FIGS. 4–6 are sectional views of a door seal according to a preferred embodiment of the present invention showing a seal without a weld flange therein (FIG. 4), a seal with a weld flange of a predetermined thickness inserted therein (FIG. 5), and a seal with a weld flange of a greater predetermined width than shown in FIG. 5 (FIG. 6).

Turning now to the drawings, and in particular to FIG. 1 thereof, an automotive vehicle 10 is shown, in partial perspective view, having a front door opening 12 and a rear door opening 14. Weld flanges 16 are formed around the perimeter of the front and rear door openings 12, 14, respectively, in a known manner. Such weld flanges are typically formed by mating body sheet metal, and are better seen in FIGS. 2 and 3. According to the present invention, the weld flanges 16a and 16b are covered with a flexible door seal 20 as will be described hereinafter.

Referring to FIG. 4, the door seal 20 has a channel 22 for receiving the weld flange 16, with two opposed sides 24 and 26, and a connecting side 28. Three digits 34 extend from the inner face of side 24 at a predetermined angle $\theta_1$. Two frustoconically shaped fingers with rounded tips 36, 38 extend from the inner face of side 26 at a predetermined angle $\theta_2$. In a preferred embodiment, angles $\theta_1$ and $\theta_2$ are between 55° and 80°. Preferably, $\Theta_2$ is greater than $\Theta_1$. The choice of angles $\theta_1$ and $\theta_2$, combined with the other features described below, allows mating to be accomplished with the desired insertion and extraction effort.

Figure 5:
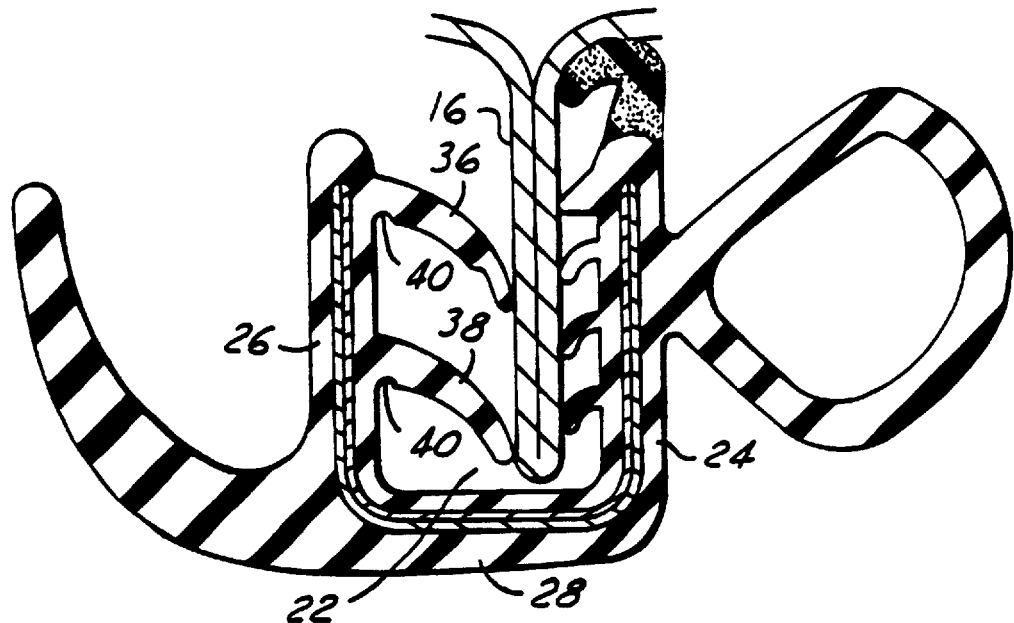
Figure 6:
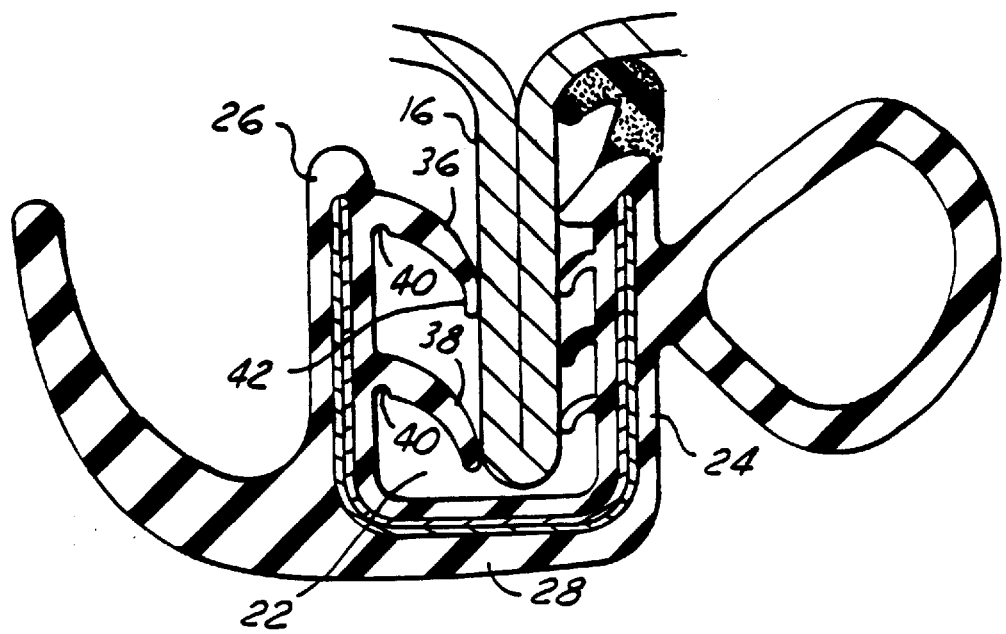

The finger 36 is made to extend further into the channel 22 than the finger 38, and both fingers 36, 38 extend more that halfway across the width of channel 22. The fingers 36, 38 have a radiused indentation hinge point 40 at their base, facing the connecting wall 28, to facilitate movement of the weld flange 16 therepast upon insertion into the channel 22 and for inhibiting movement of the weld flange 16 thereagainst upon extraction from the channel 22, see FIG. 5. The finger 36 has a beveled section tip hinge point 42 that faces the connecting wall 28, to further facilitate movement of a thicker weld flange 16 therepast upon insertion into the channel 22 and for inhibiting movement of the weld flange 16 thereagainst upon extraction from the channel 22 as shown in FIG. 6. The fingers 36 and 38 each include a substantially planar surface 36' and 38', respectively, in an unstressed state having a length substantially equal to a length of the respective finger.

The combination of these elements, the digits 34, the fingers 36, 38 with base hinge points 40 and one with a tip hinge point 42, and the extension of the fingers 36 and 38 a set distance into the channel 22, is such that the required insertion force is reduced while the required extraction force is increased, for a variety of weld flange 16 thicknesses.

Referring to FIG. 4, triangular anti-rotation member 44 extends from the inner face of side wall 24 and is located proximate to the opening of channel 22 for preventing the seal from skewing when inserted onto the weld flange. This triangular member 44 assures that the proper insertion alignment is achieved, decreasing insertion effort due to misalignment and increasing seal quality. The anti-rotation member 44 includes a surface 44' which extends from the inner face of the side wall 24 at approximately 90 degrees. A weld hiding member 46 extends from the top of the side wall 24, then curves inward towards the channel 22, covering the flange 16 to obscure it from passenger view, contributing to customer perception of seal quality. A wire carrier 48 fits in the channel walls 24, 26, 28 to provide sufficient stiffness while allowing the seal to flexibly fit in tight corners.

A bulb member 30 extends from the outer face of side 24 for compressive sealing abutment with a vehicle door (not shown) of the automotive vehicle 10, while a interior trim gap hiding lip 32 extends from the junction of side 26 and the connecting side 28. The bulb member 30 comprises three sides, a channel opening side 50 of length D1, a channel connecting side 52, of length D2 less than length D1 of side 50, and a generally arcuate side 54 connecting sides 50 and 52. The bulb 30 is designed such that in an area of small radius of curvature D4, the bulb 30 will not pucker. Moreover, the design eliminates the need for molded details around a corner thus enhancing seal appearance and fit. The bulb 30 design thus insures that a complete fit is maintained between a door (not shown) and the bulb 30, under a variety of curved or arced sections of the weld flange 16. The interior trim gap hiding lip 32 covers the interior portion of the weld flange 16 to obscure it from passenger view, improving customer perception of the seal quality.

In a preferred embodiment, the bulb 30 and the weld hiding member 46 are extruded from a sponge rubber material, such as those known in the art, while all remaining members are co-extruded from a dense rubber material.

Although the preferred embodiment of the present invention has been disclosed, various changes and modifications may be made without departing from the scope of the invention as set forth in the appended claims.

We claim:

1. A door opening seal comprising:

a channel having a first side, a second side located opposite the first side, and a connecting side connecting the first and second sides, each of the first and second sides comprising an inner face and an outer face;

at least three, flexible extruded digits disposed on the inner face of the first side and each extending therefrom into the channel at a first predetermined angle;

a first rib disposed on the inner face of the second side and extending therefrom at a second predetermined angle, said first rib disposed proximate an opening of the channel and having a tip hinge point and a first length, said first rib including a substantially planar surface in an unstressed state having a length substantially equal to the first length and facing the channel opening, said first rib being adapted to securely engage a first weld flange having a first thickness;

a second rib disposed on the inner face of the second side and extending therefrom at the second predetermined angle, said second rib disposed between said first rib and said connecting side, said second rib having a second length which is less than said first length and a substantially planar surface when in an unstressed state having a length substantially equal to the second length and facing the channel opening, the first and second ribs each including a base hinge point at a base of each of said ribs, the base hinge points of said first and second ribs facing the connecting side, said second rib being adapted to securely engage a second weld flange having a second thickness which is greater than said first thickness; and a rigid triangular anti-rotation member disposed on the inner face of the first side, the rigid triangular anti-rotation member having at least one surface extending from the inner face of the first side at approximately 90 degrees and being adapted to engage one of said first and second weld flanges to properly align said seal with respect to said one of said first and second weld flanges upon insertion into the channel.

2. The seal defined in claim 1, further comprising a bulb member attached to the outer face of the first side, the bulb member having a channel connecting side, a channel opening side, and a generally arcuate side connecting the channel connecting and channel opening sides of the bulb, the channel connecting side having a length which is less than a length of the channel opening side.

3. The seal defined in claim 1 wherein the first rib and the second rib extend more than half a distance between the first and second sides of the channel.

4. The seal defined in claim 1 further comprising a wire carrier extending through a length of the channel.

5. The seal defined in claim 1 further comprising a lip extending from an intersection of the second side and the connecting side, the lip being operative to hide an interior weld.

6. The seal defined in claim 1 wherein the first and second ribs are each extruded from rubber.

7. The seal defined in claim 6 wherein a tip of each of the first rib and the second rib is rounded.

8. The seal defined in claim 1 wherein a second predetermined angle is greater than the first predetermined angle.

* * * * *